United States Patent
Izumi

(10) Patent No.: US 8,958,702 B2
(45) Date of Patent: Feb. 17, 2015

(54) SYSTEM AND METHOD FOR REDUCING INTERFERENCE OF A POLARIZATION MULTIPLEXED SIGNAL

(75) Inventor: Futoshi Izumi, Richardson, TX (US)

(73) Assignee: Fujitsu Limited, Kawasaki-shi (JP)

( * ) Notice: Subject to any disclaimer, the term of this patent is extended or adjusted under 35 U.S.C. 154(b) by 847 days.

(21) Appl. No.: 13/050,620

(22) Filed: Mar. 17, 2011

(65) Prior Publication Data

US 2012/0237206 A1    Sep. 20, 2012

(51) Int. Cl.
*H04B 10/00*  (2013.01)
*H04B 10/532*  (2013.01)
*H04B 10/2507*  (2013.01)
*H04B 10/61*  (2013.01)

(52) U.S. Cl.
CPC .......... *H04B 10/532* (2013.01); *H04B 10/2572* (2013.01); *H04B 10/614* (2013.01)
USPC ............. 398/152; 398/65; 398/158; 398/159; 398/25; 398/30; 398/33; 398/208

(58) Field of Classification Search
CPC .......... H04B 10/2507; H04B 10/2569; H04B 10/2572; H04B 10/532; H04J 14/06
USPC .......... 398/25, 30, 33, 65, 152, 158, 159, 208
See application file for complete search history.

(56) References Cited

U.S. PATENT DOCUMENTS

| 3,867,618 | A  |   | 2/1975  | Oliver et al. ............ 235/153 AC |
|-----------|----|---|---------|--------------------------------------|
| 5,526,162 | A  | * | 6/1996  | Bergano ........................ 398/185 |
| 5,930,414 | A  | * | 7/1999  | Fishman et al. ................ 385/11 |
| 6,310,709 | B1 | * | 10/2001 | Bergano ........................ 398/185 |
| 7,869,716 | B1 | * | 1/2011  | Boroditsky et al. ........... 398/159 |
| 2005/0220457 | A1 | * | 10/2005 | Fujiwara et al. .............. 398/186 |
| 2005/0265728 | A1 | * | 12/2005 | Yao ................................ 398/152 |

(Continued)

FOREIGN PATENT DOCUMENTS

| EP | 1289174 | 3/2003 | ........... H04B 10/135 |
| EP | 2355389 | 8/2011 | ............. H04J 14/06 |
| JP | 9-18422 | 1/1997 | ............. H04B 10/28 |

OTHER PUBLICATIONS

Taga et al.; "Impact on Polarization Hole Burning Effect in Transoceanic Wavelength Division Multiplexed Systems"; Technical Digest; pp. 4, 1999.

(Continued)

*Primary Examiner* — Li Liu
(74) *Attorney, Agent, or Firm* — Baker Botts L.L.P.

(57) ABSTRACT

In accordance with the present disclosure, disadvantages and problems associated with polarization dependent effects of a polarization multiplexed optical signal may be reduced through polarization scrambling. In accordance with an embodiment of the present disclosure a method for detecting polarization scrambling of a polarization multiplexed optical signal comprises receiving a polarization multiplexed optical signal associated with an optical network. The polarization multiplexed optical signal including a scrambled polarization orientation, the polarization orientation scrambled according to a scrambling frequency. The method further comprising receiving a polarization signal indicating the polarization scrambling of the received optical signal. The method additionally comprises descrambling the optical signal according to the polarization scrambling as indicated by the polarization signal.

14 Claims, 7 Drawing Sheets

(56) References Cited

U.S. PATENT DOCUMENTS

| | | |
|---|---|---|
| 2008/0232816 A1* | 9/2008 | Hoshida et al. ............... 398/152 |
| 2009/0087194 A1* | 4/2009 | Nakashima et al. .......... 398/158 |
| 2009/0162059 A1* | 6/2009 | Nakamoto ...................... 398/48 |
| 2009/0169212 A1* | 7/2009 | Onaka et al. .................... 398/79 |
| 2009/0190930 A1* | 7/2009 | Von Der Weid ................ 398/81 |
| 2011/0182589 A1* | 7/2011 | Kotake et al. ................. 398/152 |

OTHER PUBLICATIONS

U.S. Appl. No. 12/713,792; pp. 55, Feb. 26, 2010.
U.S. Appl. No. 12/713,847; pp. 55, Feb. 26, 2010.
U.S. Appl. No. 12/713,918; pp. 56, Feb. 26, 2010.
U.S. Appl. No. 12/714,004; pp. 57, Feb. 26, 2010.
Extended European Search Report; Application No. 12155322.6-2415; pp. 6, Jul. 5, 2012.

* cited by examiner

SYSTEM AND METHOD FOR REDUCING INTERFERENCE OF A POLARIZATION MULTIPLEXED SIGNAL

TECHNICAL FIELD

The present disclosure relates generally to optical communication networks and, more particularly, to a system and method for reducing interference of a polarization multiplexed signal using polarization scrambling.

BACKGROUND

Telecommunications systems, cable television systems and data communication networks use optical networks to rapidly convey large amounts of information between remote points. In an optical network, information is conveyed in the form of optical signals through optical fibers. Optical networks may also include various network elements such as amplifiers, dispersion compensators, multiplexer/demultiplexer filters, wavelength selective switches, couplers, etc. configured to perform various operations within the network.

However, each of these network elements may also introduce polarization dependent effects on the signals traveling through the network. These effects may cause the various components of the polarization states of the signals to experience varying degrees of loss or gain, thus causing unequal power levels of the various polarization components of the signals. These effects may include polarization dependent loss (PDL) and polarization hole burning (PHB). The inequality of power caused by PDL and/or PHB may cause information or data carried by the signals to become distorted or lost.

SUMMARY

In accordance with the present disclosure, disadvantages and problems associated with polarization dependent effects of a polarization multiplexed optical signal may be reduced through polarization scrambling. In accordance with an embodiment of the present disclosure a method for detecting polarization scrambling of a polarization multiplexed optical signal comprises receiving a polarization multiplexed optical signal associated with an optical network. The polarization multiplexed optical signal including a scrambled polarization orientation, the polarization orientation scrambled according to a scrambling frequency. The method further comprising receiving a polarization signal indicating the polarization scrambling of the received optical signal. The method additionally comprises descrambling the optical signal according to the polarization scrambling as indicated by the polarization signal.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

Figure 1:
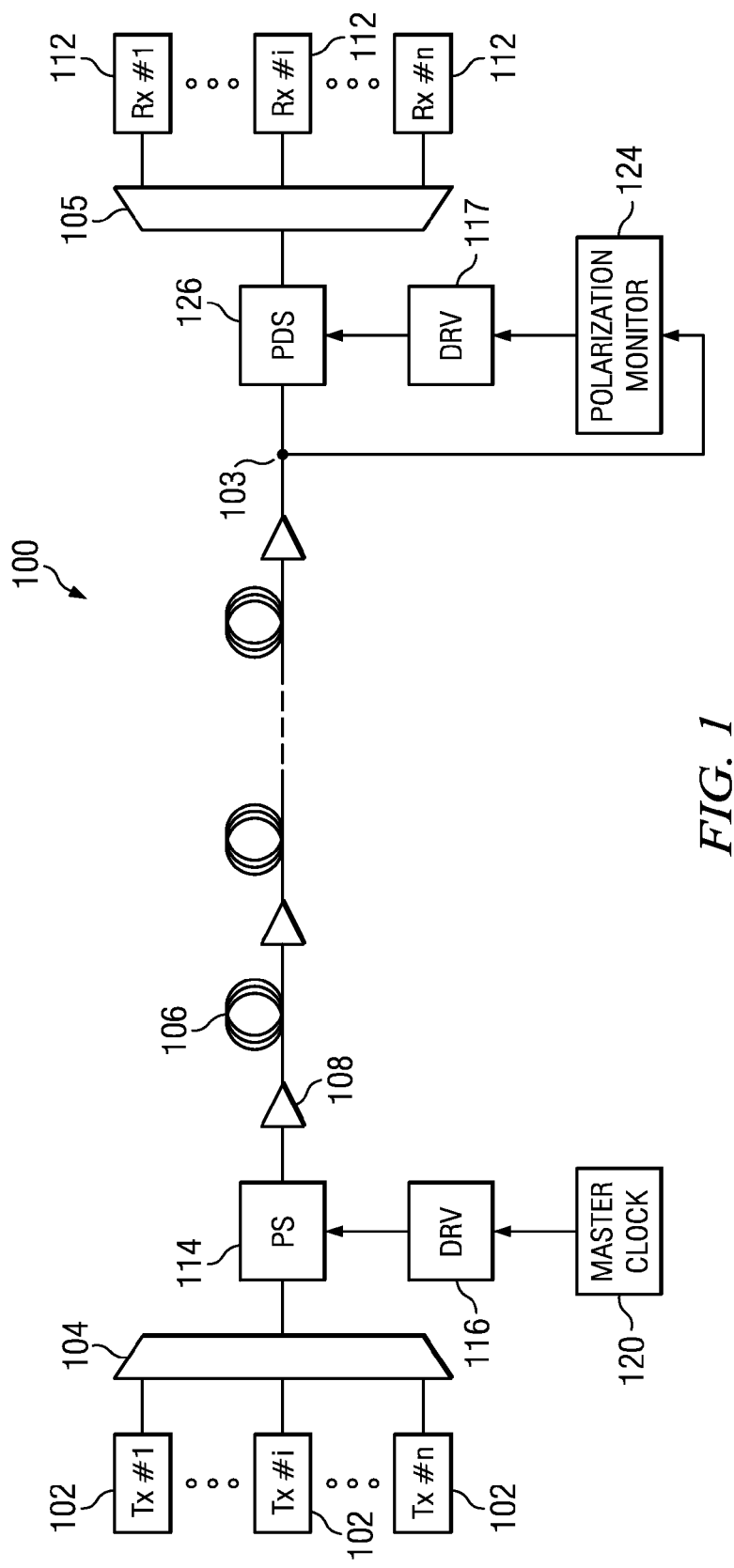
FIG. 1 illustrates an example embodiment of an optical network configured to scramble polarization modulated signals to reduce polarization dependent loss and polarization hole burning.

FIG. 1 illustrates an example embodiment of an optical network 100 configured to scramble polarization modulated signals to reduce polarization dependent loss and polarization hole burning. As discussed in further detail below, to increase the information carrying capabilities of optical networks, multiple states of polarization (SOPs) of optical signals may be modulated with data or information to generate polarization multiplexed optical signals. However, these polarization multiplexed signals may experience various polarization dependent effects while propagating through optical network 100. Therefore, one modulated state of polarization of an optical signal may be affected differently than another modulated state of polarization of the same optical signal. Additionally, the polarized nature of the polarization multiplexed signals may cause undesirable effects. These polarization dependent effects may include polarization dependent loss (PDL) and polarization hole burning (PHB).

As discussed in further detail below, optical network 100 may include a polarization scrambler (PS) 114 and a scrambler driver 116 coupled to PS 114, to help facilitate reduction of PDL and PHB of polarization modulated signals through polarization scrambling of the polarization modulated signals. For purposes of the present disclosure the terms "signal" or "optical signal" may refer to polarization modulated signals. The polarization scrambling may constantly change the polarization orientation of the modulated states of polarization of the optical signals such that the polarization dependent effects are reduced or minimized. Optical network 100 may additionally include a polarization monitor 124, a polarization descrambler (PDS) 126 and a descrambler driver 117 coupled to PDS 126 and polarization monitor 124 that may be configured to enable coherent detection and descrambling of the polarization scrambling created by PS 114 to facilitate reception and information extraction of the optical signal.

Optical network 100 may comprise a point-to-point optical network with terminal nodes, a ring optical network, a mesh optical network, or any other suitable optical network or combination of optical networks. Optical fibers 106 comprise thin strands of glass capable of communicating optical signals over long distances with very low loss. Optical fibers 106 may comprise any suitable type of fiber, such as a Single-Mode Fiber (SMF), Enhanced Large Effective Area Fiber (ELEAF), or a TrueWave® Reduced Slope (TW-RS) fiber.

Optical network 100 may include devices configured to transmit optical signals over fibers 106. Information may be transmitted and received through network 100 by modulation of one or more wavelengths of light to encode the information on the wavelength. In optical networking, one or more wavelengths of light within the transmitting spectrum of the network may be referred to as a channel. Each channel may be configured to carry a certain amount of information through optical network 100. In some instances a channel may include a wavelength of light modulated with information and additional wavelengths that act as a buffer between a modulated wavelength of an adjacent channel.

To increase the information carrying capabilities of optical network 100, multiple signals transmitted at multiple channels may be combined into a single optical signal. The process of communicating information at multiple channels of a single optical signal is referred to in optics as wavelength division multiplexing (WDM). Dense wavelength division multiplexing (DWDM) refers to the multiplexing of a larger (denser) number of wavelengths, usually greater than forty, into a fiber. WDM, DWDM, or other multi-wavelength transmission techniques are employed in optical networks to increase the aggregate bandwidth per optical fiber. Without WDM or DWDM, the bandwidth in optical networks may be limited to the bit-rate of solely one wavelength. With more bandwidth, optical networks are capable of transmitting greater amounts of information. Optical network 100 may be configured to transmit disparate channels using WDM, DWDM, or some other suitable multi-channel multiplexing technique, and to amplify the multi-channel signal.

Besides the number of channels carried, another factor that affects how much information can be transmitted over an optical network may be the bit rate of transmission. The greater the bit rate, the more information that may be transmitted.

Polarization division multiplexing (PDM) technology may enable achieving a greater bit rate for information transmission. PDM transmission comprises modulating information onto various polarization components of an optical signal associated with a channel. The polarization of an optical signal may refer to the direction of the oscillations of the optical signal. The term "polarization" may generally refer to the path traced out by the tip of the electric field vector at a point in space, which is perpendicular to the propagation direction of the optical signal. The term "linear polarization" may generally refer to a single direction of the orientation of the electric field vector. Generally, an arbitrary linearly polarized wave can be resolved into two independent orthogonal components, labeled x and y, which are in phase with each other.

For example, in polarization multiplexed transmission, an optical beam created by a laser may be highly linearly polarized. The beam may be divided by a polarization beam splitter according to an x-polarization component of the beam and a y-polarization component of the beam. The x-polarization component may be aligned with a horizontal axis that is perpendicular to the propagation direction of the beam. The y-polarization component may be aligned with a vertical axis that is perpendicular to both the propagation direction of the beam and the horizontal axis. Therefore, the x-polarization component may be referred to as being "horizontally polarized" and the y-polarization component may be referred to as being "vertically polarized." It is understood that the terms "horizontal" and "vertical" are merely used to denote a frame of reference for depicting the orthogonal relationship between the axes and the polarization orientations aligned with those axes. The terms are not limited to any absolute polarization orientation.

Following splitting of the beam into the x and y polarization components, information may be modulated onto both beams. Following modulation, both beams may be combined by a polarization beam combiner such that the combined beam comprises an optical signal with two polarization components (e.g., an x-polarization component and a y-polarization component) with information modulated onto each polarization component. Accordingly, by modulating information onto both the y-polarization component and x-polarization component of the signal, the amount of information that may be carried by the channel associated with the signal over any given time may increase (e.g., increasing the bit rate of the channel).

The various elements and devices in optical networks may affect the modulated x and y polarization components of each channel associated with the optical signals in different manners. The effects may depend on the orientation of the x and y polarization components. Fibers 106, multiplexers 104, and add/drop modules (not expressly shown) may attenuate signals as the signals pass through these elements and amplifiers 108 may amplify the signals. These elements may attenuate and amplify the various polarization components of each channel within the signals differently depending on the orientation of the polarization components, thus causing a polarization dependent loss (PDL) and a polarization dependent gain (PDG).

For example, a multiplexer 104 may attenuate the modulated y-polarization of a wavelength associated with a channel greater than it may attenuate the modulated x-polarization of the same wavelength. Additionally, the modulated x and y polarizations of one wavelength associated with one channel may be affected differently than the x and y polarization of another wavelength associated with a different channel. Similarly, amplifiers 108 may amplify the modulated x and y polarization components of each channel associated with the optical signals differently. Accordingly, in a multi-polarization WDM signal, each modulated polarization component of each channel may experience varying degrees of gain and loss while passing through an optical network. Although the polarization dependent effects of the various network components may result from both PDL and PDG, the overall result of the effects may be referred to simply as PDL.

Another polarization dependent effect is polarization hole burning (PHB). PHB may seriously reduce the performance of rare-earth doped fiber optical amplifiers, such as an erbium doped fiber amplifier (EDFA), used to amplify signal strength within the communication system.

PHB occurs when a strong, polarized optical signal is launched into an EDFA. This strong signal can cause anisotropic saturation of the amplifier. This saturation effect, which is related to the population inversion dynamics of the EDFA, depresses the gain of the EDFA for light with the same state of polarization (SOP) as the saturating signal. Thus, PHB causes a signal having a SOP orthogonal to the saturating signal to have a gain greater than that of the saturating signal.

As a result, amplified spontaneous emission (ASE) noise in the SOP orthogonal to the saturating signal may accumulate faster than in the SOP of the saturating signal. In a communication system utilizing a chain of EDFAs operating at or near saturation, ASE noise may accumulate at each amplifier stage. As the noise builds up over the course of the system, the signal-to-noise ratio (SNR) for a signal with a SOP orthogonal to the saturating signal may rise to unacceptable levels.

The SNR in such cases can then cause errors in the received data stream. Accordingly, mitigating the effects of PHB in amplified optical systems is desirable.

As disclosed in further detail below, network 100 may be configured to scramble the polarization of a polarization division multiplexed signal such that the orientation of the modulated polarization components (e.g., x polarization and y polarization components) may constantly change. Due to the orientation of the modulated polarization components constantly changing, and PHB and PDL being dependent on the orientation of polarization, the effect of PDL and PHB on any particular modulated polarization component may be substantially reduced or eliminated.

Additionally, as further discussed below, network 100 may be configured to coherently detect the polarization orientation of the modulated polarization components. Therefore, network 100 may descramble the polarization division multiplexed signal to reorient the modulated polarization components such that the information modulated onto the polarization components may be read. For purposes of the present disclosure, the terms "polarization" or "polarization orientation" of an optical signal may refer to the polarization orientation, based on a frame of reference, of one or more modulated polarization components of an optical signal.

Optical network 100 may include one or more optical transmitters (Tx) 102 configured to transmit optical signals through optical network 100 in specific wavelengths. Transmitters 102 may comprise any system, apparatus or device configured to convert an electrical signal into an optical signal and transmit the optical signal. For example, transmitters 102 may each comprise a laser and a modulator configured to receive electrical signals and modulate the information contained in the electrical signals onto a beam of light produced by the laser at a particular wavelength and transmit the beam carrying the signal throughout the network.

Multiplexer 104 may be coupled to transmitters 102 and may be any system, apparatus or device configured to combine the signals transmitted by transmitters 102, in individual wavelengths, into a single WDM or DWDM signal.

Amplifiers 108 may amplify the multi-channeled signals within network 100. Amplifiers 108 may be positioned before and/or after certain lengths of fiber 106. Amplifiers 108 may comprise any system, apparatus, or device configured to amplify signals. For example, amplifiers 108 may comprise an optical repeater that amplifies the optical signal. This amplification may be performed without opto-electrical or electro-optical conversion. In some embodiments, amplifiers 108 may comprise an optical fiber doped with a rare-earth element. When a signal passes through the fiber, external energy may be applied to excite the atoms of the doped portion of the optical fiber, which increases the intensity of the optical signal. As an example, Amplifiers 108 may comprise an erbium-doped fiber amplifier (EDFA). However, any other suitable amplifier, such as a semiconductor optical amplifier (SOA), may be used.

Network 100 may also include one or more demultiplexers 105 at one or more destinations of network 100. Demultiplexer 105 may comprise any system apparatus or device that may act as a demultiplexer by splitting a WDM signal into its individual channels or wavelengths. In some embodiments, demultiplexer 105 may comprise a multiplexer 104 but configured to split WDM signals into their individual channels instead of being configured to combine individual channels into one WDM signal. For example, network 100 may transmit and carry a forty channel DWDM signal. Demultiplexer 105 may divide the single, forty channel DWDM signal into forty separate signals according to the forty different channels.

Network 100 may also include receivers 112 coupled to demultiplexer 105. Each receiver 112 may be configured to receive signals transmitted in a particular wavelength or channel and process the signals for the information that they contain (e.g., decode the modulation to extract the information). Accordingly, network 100 may include at least one receiver 112 for every channel of the network.

As mentioned above, in addition to transmitting and receiving optical signals, network 100 may be configured to scramble the polarization of the optical signals to reduce PDL and PHB. Network 100 may include PS 114 coupled to the output of multiplexer 104. PS 114 may be configured to scramble the polarization of optical signals received from multiplexer 104. PS 114 may comprise any suitable system, apparatus or device that may scramble the polarization of an optical signal such that the signal may also be descrambled according to information associated with the scrambling technique. In some embodiments PS 114 may be configured to scramble an optical signal by constantly rotating the polarization of the optical signal at a constant rate of rotation.

Accordingly, the optical signal may later be descrambled by rotating the polarization in the opposite direction and the same amount used in scrambling to correct for the rotation or scrambling. In some embodiments, PS 114 may comprise a Faraday Rotator.

Network 100 may also include a scrambler driver 116 coupled to PS 114. Scrambler driver 116 may comprise any suitable system, apparatus, or device configured to control and drive the polarization scrambling of PS 114. For example, scrambler driver may comprise a control unit having a processor and memory. The memory may include instructions stored thereon and related to directing PS 114 to scramble the signal. The processor may be configured to read and execute the instructions stored within the memory such that scrambling driver 116 may control the scrambling performed by PS 114.

In some embodiments, scrambler driver 116 may be configured to drive PS 114 to rotate the polarization of a signal at a constant frequency such that the polarization orientation of the signal undergoes a full rotation and repeats after a certain period of time. The scrambling rate may be approximately greater than or equal to two kilohertz (2 kHz). For example, in some embodiments the scrambling rate may be approximately eight kilohertz (8 kHz). In yet other embodiments the scrambling rate may be sixteen kilohertz (16 kHz). Due to the rotational nature of the polarization scrambling, the polarization scrambling may be approximately expressed as a sine or cosine function with a particular frequency that may be referred to as a scrambling frequency. The phase of the sine function may represent the polarization orientation of the scrambled signal. The polarization orientation may be expressed as a deviation angle from a particular frame of reference.

For example, as mentioned above, before entering PS 114, a signal may include a modulated x-polarization component that is aligned with a defined horizontal axis and may also include a modulated y-polarization component that is aligned with a defined vertical axis. The horizontal and vertical axes may provide the frame of reference for the polarization orientation. Therefore, the polarization orientation may be expressed as an angle of deviation of the modulated x-polarization component from the horizontal axis and the modulated y-polarization from the vertical axis. As an example, a polarization orientation of 30° ($\pi/6$ radians) clockwise may denote that the respective angles between the modulated x and y polarization components and the horizontal and vertical axes are 30° (π/6 radians) in the clockwise direction from the horizontal and vertical axes respectively.

The polarization scrambling may be approximately expressed by the following equation:

$$\theta(t)=\sin(\omega t)$$

In the above equation, the phase of the sine function (θ) may represent the angle of the polarization orientation with respect to a frame of reference (e.g., an x or y axis). Additionally, ω may represent the frequency of rotations for a given period of time (e.g., degrees or radians per second) and t may represent a given time.

Scrambler driver 116 may also be configured to perform operations and be driven by a system master clock 120 configured to provide a consistent clock for network 100. Scrambler driver 116 may be configured to direct PS 114 to scramble signals according to the clock signal received from master clock 120 such that the scrambling frequency and polarization orientation of the scrambled signals may be a function of master clock 120. For example, scrambler driver 116 may be configured to direct PS 114 to rotate the polarization of a signal each time master clock 120, transitions from "HIGH" to "LOW" and/or "LOW" to "HIGH."

Network 100 may also be configured to descramble the scrambled signal at one or more destinations of network 100. Due to propagation delays in the propagation of the scrambled signals in network 100, the polarization orientation of a signal received at a destination at a particular time may not be the same as the polarization orientation of a signal being scrambled by PS 114 at that time. This delay may cause a phase shift in the polarization orientation between a signal being received at a destination and a signal being scrambled by PS 114 at a particular time.

The polarization scrambling at the destination node may be approximately expressed by the following equation:

$$\theta(t)=\sin(\omega t+\phi)$$

Similarly to the equation indicating the polarization scrambling by PS 114, in the above equation, the phase of the sine function (θ) may represent the angle of the polarization orientation with respect to a frame of reference (e.g., an x or y axis). Additionally, ω may represent the frequency of rotations for a given period of time (e.g., degrees or radians per second) and t may represent a given time. Further, φ may represent the phase shift between scrambling at PS 114 and scrambling at the destination node.

Therefore, the polarization scrambling at the destination node may need to be determined at the destination node such that the scrambled signal may be descrambled. As discussed in further detail below, the polarization scrambling at the destination node may be determined using a variety of methods and components.

In some embodiments, network 100 may include a polarization monitor 124 configured to detect and determine the polarization scrambling of the scrambled signal according to the same frame of reference used for scrambling. As discussed above, the frame of reference may be related to a defined "horizontal" axis and a defined "vertical" axis. Polarization monitor 124 may comprise any suitable system, apparatus or device configured to detect and determine the polarization scrambling of an optical signal. In the present embodiment, polarization monitor 124 may be coupled to network 100 at node 103 of network 100. The input port of PDS 126 may also be coupled to node 103 such that polarization monitor 124 may determine the polarization scrambling of one or more scrambled signals as the scrambled signals enter PDS 126 from node 103. Based on the determined polarization scrambling, polarization monitor 124 may communicate polarization information to descrambling driver 117, communicatively coupled to polarization monitor 124.

In some instances, the polarization information may comprise an electrical sine wave having a frequency and phase that generally represent the polarization scrambling of optical signals received at PDS 126. As mentioned above, the frequency of the sine wave may approximately represent the polarization scrambling frequency used by PS 114. The phase of the electrical sine wave may represent the polarization orientation of the signals received at PDS 126 expressed as a deviation angle from a particular frame of reference (e.g., the deviation angle from the horizontal axis by the x-polarization component and the deviation angle from the vertical axis by the y-polarization component). As previously mentioned, due to propagation delays between PS 114 and PDS 126, it is understood that the phase representing the polarization orientation of a signal being scrambled by PS 114 may not be the same as the phase representing the polarization orientation of a signal being received by PDS 126. Also, as discussed above, this phase difference may be represented by φ in the equation generally representing scrambling of signals received at PDS 126.

Descrambling driver 117 may comprise any suitable system, apparatus, or device configured to control and drive PDS 126 such that PDS 126 may descramble scrambled signals received by PDS 126. For example, descrambling driver 117 may comprise a control unit having a processor and memory similar to scrambling driver 116. In some embodiments, descrambling driver 117 may be configured to receive the polarization information from polarization monitor 124 and direct PDS 126 to adjust the polarization orientation of scrambled signals received at PDS 126 accordingly, such that the scrambled signals are descrambled.

PDS 126 may be communicatively coupled to descrambling driver 117 and may comprise any suitable system, apparatus or device configured to adjust the polarization orientation of an optical signal according to instructions received by descrambling driver 117. Accordingly, PDS 126 may descramble signals received at its input terminal as instructed by descrambling driver 117. Descrambling driver 117 and PDS 126 may be referred to collectively as a descrambling unit of network 100. In some embodiments, PDS 126 may be configured to rotate the polarization orientation of an optical signal and may comprise a Faraday rotator.

In the present embodiment, the output of PDS 126 may be coupled to the input of demultiplexer 105 such that demultiplexer 105 demultiplexes the unscrambled WDM signal into its individual channels. Accordingly, receivers 112 may process the information contained on their respective channels.

The following example illustrates an interaction between polarization monitor 124, descrambling driver 117 and PDS 126 to descramble a scrambled signal. Polarization monitor 124 may detect the polarization scrambling of the signal being received by PDS 126. In the present example, the signal may have been scrambled by PS 114 rotating the polarization of the signal at a particular scrambling frequency. Polarization monitor 124 may accordingly generate an electrical signal representing the scrambling. The electrical signal may comprise a sine wave having a frequency approximately representing the scrambling frequency and a phase generally representing the polarization orientation of the scrambled signal. Polarization monitor 124 may transmit the electrical signal to descrambling driver 117.

Descrambling driver 117 may direct PDS 126 to rotate the scrambled signal in the opposite direction that PS 114 may have rotated the signal. For example, PS 114 may rotate the signal clockwise and therefore, PDS 126 may rotate the signal counterclockwise to descramble the scrambling. Descrambling driver 117 may also direct PDS 126 to rotate the scrambled signal at a rotation rate associated with the frequency indicated by the electrical signal (e.g., the frequency of the sine wave), which may represent the scrambling frequency. Accordingly, PDS 126 may also rotate the scrambled signal at the same rate of rotation as the scrambling to ensure proper descrambling.

Additionally, descrambling driver 117 may use the phase of the electrical signal to determine the proper frame of reference from which to begin rotating the signal. For example, the phase of the electrical signal as first received by descrambling driver 117 may be 30°. The 30° phase may represent a 30° clockwise deviation of the polarization components from the frame of reference (e.g., the horizontal and vertical axes). Therefore, descrambling driver 117 may direct PDS 126 to initially rotate the polarization of the scrambled optical signal 30° counterclockwise and then to begin rotating at the scrambling frequency such that the scrambled signal may be in phase with the descrambling.

With the descrambling being in phase with the scrambled signal, and the scrambled signal being rotated at approximately the same rate of rotation for scrambling, but in the opposite direction, the optical signal leaving PDS 126 may be descrambled and may be appropriately received by receivers 112. As mentioned above, following descrambling, the signal may be received by demultiplexer 105, and the individual channels may be processed by receivers 112. As mentioned previously, scrambling may be advantageous to reduce PDL and PHB of polarization multiplexed optical signals and coherent descrambling may be advantageous to enable extracting the information from the polarization multiplexed signals that have been scrambled.

Modifications, additions or omissions may be made to network 100 without departing from the scope of the present disclosure. For example, network 100 may include more or fewer components than those listed. Additionally, the components listed may include various subcomponents used to perform the operations.

Figure 2:
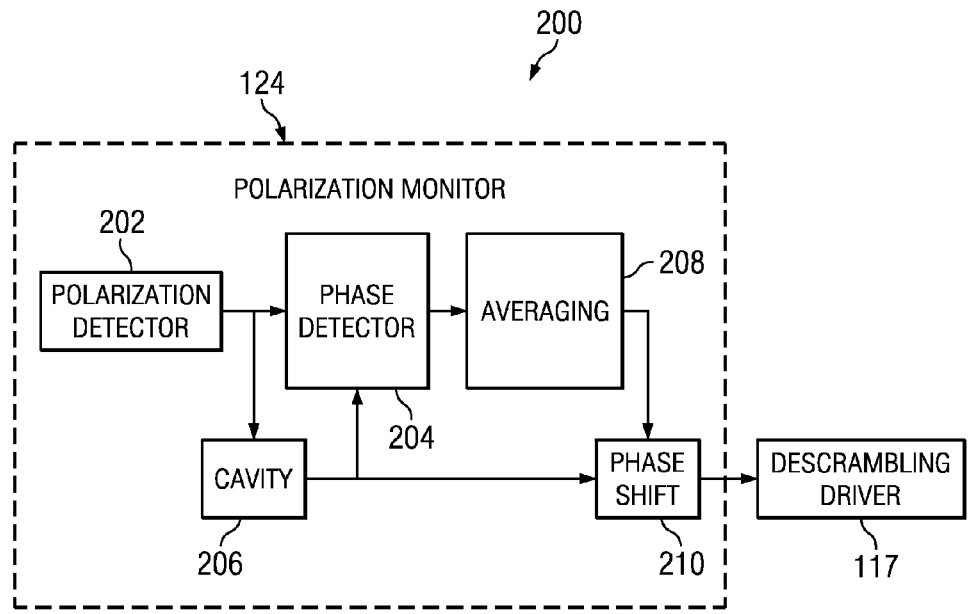
FIG. 2 illustrates a block diagram of a system that includes an example embodiment of a polarization monitor coupled to a descrambling driver in an optical network.

FIG. 2 illustrates a block diagram of a system 200 that includes an example embodiment of polarization monitor 124 coupled to descrambling driver 117 in network 100. In the present example, polarization monitor 124 may include a polarization detector 202 comprising any suitable system, apparatus or device configured to detect and determine the polarization scrambling of optical signals. Polarization detector 202 may be configured to generate an electrical signal indicating the detected polarization scrambling of the optical signal.

As an example, polarization detector 202 may include a polarization beam splitter (PBS) (not expressly shown) configured to receive the scrambled signal at node 103 of network 100. The PBS may split the scrambled signal according to the horizontal axis of the frame of reference and the vertical axis of the frame of reference, thus splitting the scrambled signal into a horizontally polarized beam and a vertically polarized beam. Polarization detector 202 may use photodiodes to convert each of the horizontally polarized beam and the vertically polarized beam into electrical signals representing the power of each of the horizontally polarized beam and the vertically polarized beam. The power of the horizontally polarized beam and the vertically polarized beam may indicate the polarization orientation of the modulated x and y polarization components of the scrambled signal. For example, the more aligned the modulated x and y polarization components are with the horizontal and vertical axes of the frame of reference, the more power the horizontally and vertically polarized beams may have. Further, the less aligned the x and y polarization components are with the horizontal and vertical axes of the frame of reference, the less power the horizontally polarized and vertically polarized beams may have.

In some embodiments, polarization detector 202 may include a sum circuit (not expressly shown) coupled to the photodiodes and configured to receive the electrical signals indicating the power of the horizontally and vertically polarized beams (which may indicate the orientation of the modulated x and y polarization components of the optical signal). The sum circuit may add the electrical signals indicating the powers of the horizontally and vertically polarized beams into a signal representing the power of both beams, which may represent the polarization orientation of scrambled signals received at polarization detector 202. In some embodiments, the sum circuit may comprise an op amp sum circuit. The combined electrical signal leaving the sum circuit may pass to a band pass filter (not expressly shown) included in polarization detector 202 and coupled to the sum circuit. The band pass filter may be configured to pass frequencies of the electrical signal substantially similar to the scrambling frequency and to block other frequencies. Accordingly, the electrical signal leaving the band pass filter may comprise an electrical signal sine wave having a frequency indicating the scrambling frequency.

The electrical signal leaving the band pass filter may also have amplitude related to the power of the horizontal and vertical polarization components, which may be related to the polarization orientation of the scrambled signals. The amplitude of the electrical signal in the time domain may be related to the phase of the electrical signal in the frequency domain. Therefore, the phase of the electrical signal leaving the band pass filter may indicate the polarization orientation of the scrambled signal. Following leaving the band pass filter, the electrical signal having a frequency and phase indicating the scrambling frequency and polarization orientation respectively, may leave polarization detector 202.

In some instances, the adding of the electrical signals leaving the photodiodes and the operations being performed by the band filter may be performed by a processing unit. Additionally, it is understood that although a specific configuration of polarization scrambling detection has been described, any suitable, system apparatus or device configured to detect the polarization scrambling and generate a signal representing the polarization scrambling such as done by polarization detector 202 is contemplated.

As mentioned above, the electrical signal leaving polarization detector 202 may comprise a sine wave with the same frequency as the scrambling frequency to generally represent the polarization scrambling of the scrambled signal, as discussed above. Additionally, the phase of the electrical signal generated by polarization detector 202 may approximately represent the polarization orientation of the scrambled optical signal. However, the signal generated by polarization detector 202 may also include fluctuations in the frequency and phase due to environmental factors that may affect the optical signals entering polarization detector 202. Accordingly, although the electrical signal generated by polarization detector 202 may generally represent the polarization scrambling of the scrambled signal, the fluctuations may impair the polarization descrambling.

Therefore, in some embodiments with fluctuations within the signal received by polarization detector 202, polarization monitor 124 may also include a resonator or cavity 206 coupled to polarization detector 202 and configured to receive the electrical signal from polarization detector 202. Cavity 206 may comprise any suitable system, apparatus or device configured to resonate at a particular frequency and generate a signal at such frequency. Cavity 206 may be configured to resonate at the scrambling frequency such that, as cavity 206 receives the electrical signal from polarization detector 202, cavity 206 may generate an electrical signal having the scrambling frequency.

Cavity 206 may generate a substantially clean signal where the frequency (e.g., the scrambling frequency) of the signal generated by cavity 206 contains little to no fluctuations (sometimes referred to as jitter). In contrast, as previously described, the electrical signal leaving polarization detector 202 may include fluctuations due to environmental factors that may affect the optical signals entering polarization detector 202. Although the signal generated by cavity 206 may have approximately the scrambling frequency, in some instances the signal generated by cavity 206 may be out of phase with the signal generated by polarization detector 202. Therefore, the signal generated by cavity 206 may be out of phase with the polarization scrambling of the optical signal received by polarization detector 202. Consequently, polarization detector 202 and cavity 206 may both be coupled to a phase detector 204 such that the signals generated by polarization detector 202 and cavity 206 are received by phase detector 204.

Phase detector 204 may comprise any suitable system, apparatus or device configured to determine the phase difference between the signals generated by polarization detector 202 and cavity 206. For example, phase detector 204 may comprise hardware, software, firmware, or any combination thereof configured to detect the phase difference between signals received from polarization detector 202 and cavity 206. Therefore, phase detector 204 may determine the phase difference between the substantially clean electrical signal generated by cavity 206 and the polarization scrambling of signals received at polarization detector 202 and represented by the electrical signal generated by polarization detector 202. In the present embodiment, phase detector 204 may be configured to analyze the electrical signals received by cavity 206 and polarization detector 202 using signal processing methods. Phase detector 204 may comprise hardware, software or a combination of both configured to determine the phase difference according to operating instructions stored in memory that is accessible by phase detector 204. Phase detector 204 may be coupled to an averaging unit 208 and may be configured to transmit the phase difference to averaging unit 208.

Averaging unit 208 may comprise any suitable system, apparatus or device configured to average the phase difference as received from phase detector 204. For example, averaging unit 208 may comprise hardware, software, firmware, or any combination thereof configured to average the phase difference as received by phase detector 204. By averaging the determined phase difference, averaging unit 208 may reduce phase fluctuations in the phase difference as determined by phase detector 204 that may occur due to the jitter within the signal generated by polarization detector 202. Averaging unit 208 may transmit the averaged phase difference to a phase shifting unit 210 coupled to averaging unit 208.

Phase shifting unit 210 may be coupled to averaging unit 208 and cavity 206 such that phase shifting unit 210 receives the signal generated by cavity 206 and the averaged phase difference generated by averaging unit 208. Phase shifting unit 210 may comprise any suitable system, apparatus or device configured to shift the phase of the signal received from cavity 206 by the averaged phase difference received from averaging unit 208. For example, phase shifting unit 210 may comprise hardware, software, firmware, or any combination thereof configured to shift the phase of the signal generated by cavity 206 by the averaged phase difference.

As mentioned above, the phase difference may represent the phase difference between the signal generated by cavity 206 and the scrambling of the optical signal received at polarization detector 202. Therefore, by shifting the electrical signal received from cavity 206 by the averaged phase difference, phase shifting unit 210 may generate an electrical signal generally representing the polarization scrambling of the scrambled signal (e.g., an electrical sine wave having frequency and phase representing the scrambling frequency and polarization orientation respectively) received by polarization monitor 124 at polarization detector 202 and also received by PDS 126. Additionally, by combining the phase shift to the relatively clean electrical signal generated by cavity 206, phase shifting unit 210 may generate an electrical signal with little to no jitter. Phase shifting unit 210 may be communicatively coupled to descrambling driver 117 and may be configured to transmit the signal representing the polarization scrambling to descrambling driver 117.

Descrambling driver 117 may direct PDS 126 to descramble the scrambled signal based on the frequency and phase of the electrical signal received from polarization monitor 124 via phase shifting unit 210. For example, as discussed above, descrambling driver 117 may direct PDS 126 to rotate the scrambled signal at the frequency of the electrical signal received by descrambling driver 117 from phase shifting unit 210. Additionally, as discussed above, descrambling driver 117 may use the phase of the electrical signal to provide the appropriate phase shift to the scrambled signal upon rotating the signal. Therefore, polarization monitor 124 and descrambling driver 116 may be configured to coherently detect and descramble the polarization scrambling of an optical signal.

Modifications, additions or omissions may be made to system 200 without departing from the scope of the present disclosure. For example, in some embodiments where the scrambled signal has little to no jitter, cavity 206, phase detector 204, averaging unit 208 and phase shifting unit 210 may not be necessary. Additionally, although certain functions are described as being performed by discreet components, it is understood that system 200 may include more or fewer components configured to perform the described operations.

Figure 3:
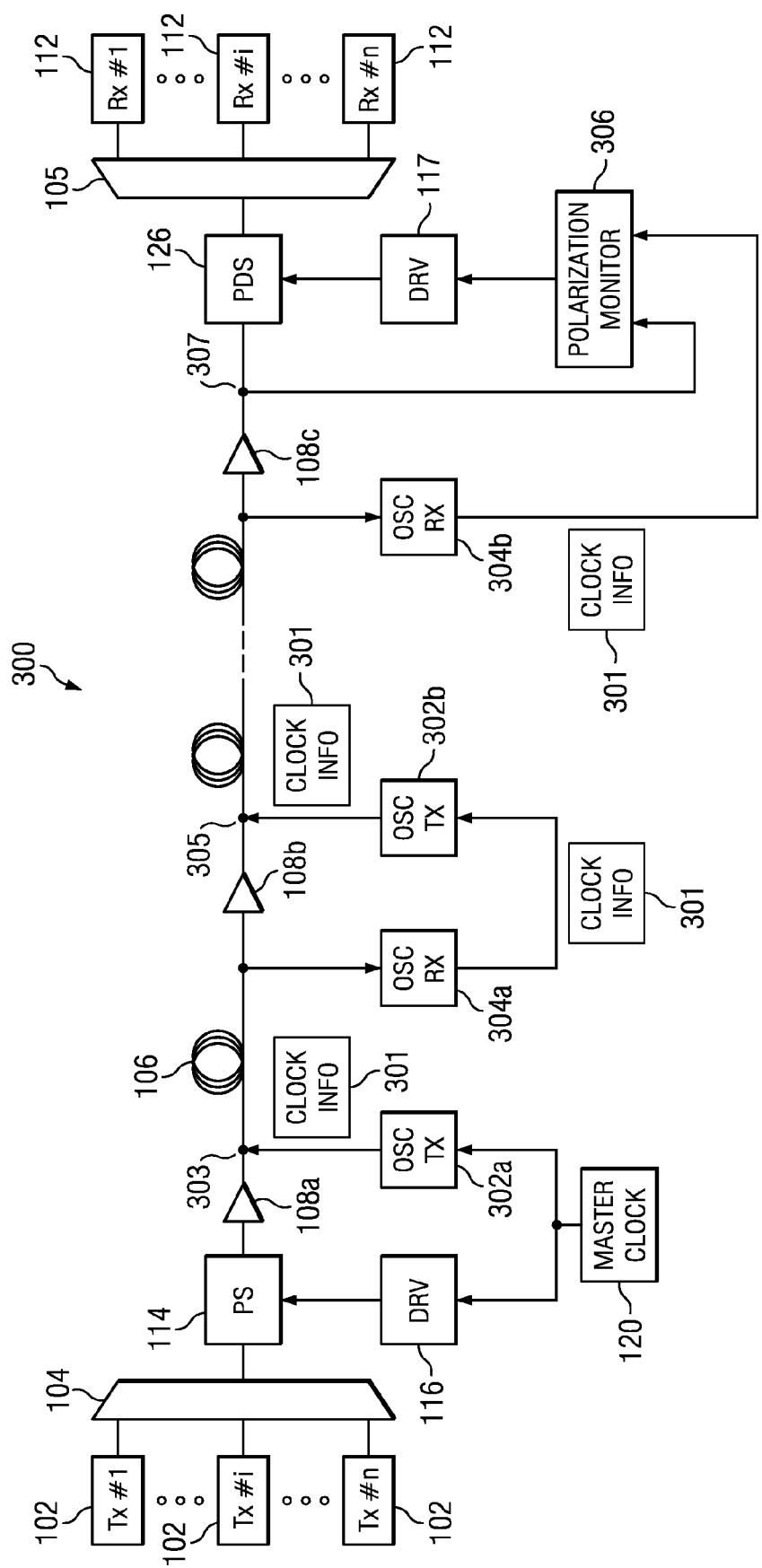
FIG. 3 illustrates another example embodiment of an optical network configured to scramble polarization modulated signals to reduce polarization dependent loss and polarization hole burning.

FIG. 3 illustrates another example embodiment of an optical network 300 configured to scramble polarization modulated signals to reduce polarization dependent loss and polarization hole burning. Network 300 may include components substantially similar to network 100 such as transmitters 102, multiplexer 104, PS 114, scrambling driver 116, amplifiers 108, fibers 106, descrambling driver 117, PDS 126, demultiplexer 105 and receivers 112.

Network 300 may also include optical supervisory channel (OSC) components including OSC transmitters 302, OSC receivers 304 configured to transmit polarization information that is associated with scrambled signals. Network 300 may also include polarization monitor 306 configured to determine the polarization scrambling of signals based in part on the polarization information transmitted over the OSC in preparation for descrambling the scrambled signals.

As mentioned above, in some instances, the scrambling frequency and polarization orientation of the scrambled signals may be a function of master clock 120. Therefore, it may be advantageous to transmit clock information 301 associated with the scrambling of a signal at PS 114 through network 300 such that PDS 126 may properly unscramble the signal based on clock information 301 before the signal is received by receivers 112.

Clock information 301 of network 300 may comprise any suitable information that may be used to determine the polarization scrambling of a signal scrambled by PS 114 as a function of master clock 120. In some embodiments, clock information 301 may comprise an optical signal generally representing the electrical signal generated by master clock 120 and driving the scrambling of optical signals by PS 114. In the same or alternative embodiments, due to the polarization scrambling being a function of the master clock, clock information 301 may include a signal approximately representing the scrambling frequency. However, as discussed further below, due to differences in propagation times between the OSC and the scrambled signal, clock information 301 may be out of phase with the polarization scrambling such that the phase of clock information 301 may not accurately represent the polarization orientation of the scrambled signal.

The OSC may comprise a dedicated channel configured to provide supervisory and maintenance information for network 300. It may be advantageous to send clock information 301 via the OSC because the information on the OSC may not undergo the polarization scrambling. Thus, clock information 301 that may be needed to unscramble the signal may be transmitted without being scrambled.

In the present embodiment, network 300 may include an OSC transmitter 302a configured to send clock information 301 which may be associated with the polarization scrambling done by PS 114. OSC transmitter 302a may comprise any suitable optical transmitter configured to convert electrical signals to optical signals that are transmitted over an OSC.

OSC transmitter 302a may be coupled in parallel with scrambler driver 116 to master clock 120 such that OSC transmitter 302a and scrambler driver 116 receive the clock signal from master clock 120 at the same time. Accordingly, OSC transmitter 302a may convert the electrical master clock signal driving scrambler driver 116 into clock information 301 that comprises an optical signal generally representing master clock 120. Therefore, clock information 301 associated with the polarization scrambling of a scrambled signal may propagate through network 300 via the OSC while the scrambled signal associated with clock information 301 also propagates through network 300.

As discussed in further detail below, polarization monitor 306 may receive clock information 301 and based partially on clock information 301, may generate an electrical signal having a frequency and phase generally indicating the scrambling frequency and polarization orientation, respectively, of a scrambled signal received at polarization monitor 304. Similar to as described with respect to FIG. 1, polarization monitor 306 may transmit the signal to descrambling driver 117 such that descrambling driver 117 may direct PDS 126 to descramble the scrambled signal.

Due to different delays between OSC propagation and the scrambled signal propagation, clock information 301 and the scrambled signal associated with clock information 301 may not respectively reach polarization monitor 306 and PDS 126 at the same time. Accordingly, the polarization scrambling of a signal received at PDS 126 may be out of phase with clock information 301 received at polarization monitor 306.

As noted above, the phase shift may be caused by differences in delays between the scrambled signal and clock information 301. For example, OSC transmitter 302a and scrambler driver 116 may receive a clock signal from master clock 120 at the same time. OSC transmitter 302a may be configured to generate and transmit clock information 301 based on the received signal and scrambler driver 116 may be configured to generate a control signal that directs PS 114 to rotate the polarization of received signals based on the received signal. However, it may take OSC transmitter 302a a different amount of time to generate and transmit clock information 301 than it may take PS 114 to receive the control signal from scrambler driver 116 and rotate the optical signal. Therefore, although clock information 301 may represent the scrambling frequency, the difference in time between converting the signals received from master clock 120 into clock information 301 representing those signals and rotating the optical signals may create a phase difference between clock information 301 and the scrambling of the signal at PS 114.

Additionally, the newly scrambled signal may also experience a delay as it passes through amplifier 108a. Accordingly, clock information 301 and the scrambled signal associated with clock information 301 may not reach point 303 of network 300 at the same time, such that the phase difference between clock information 301 and the scrambled signal may be increased. Similar differences in delay may occur as the scrambled signal and clock information 301 propagate through network 300.

As another example, before reaching amplifier 108b, the OSC may be filtered from the propagating signal and sent to an OSC receiver 304a. OSC receiver 304a may convert the information carried by the OSC (including clock information 301) onto an electrical signal and communicate at least part of that information (including clock information 301) to an OSC transmitter 302b. OSC transmitter 302b may convert the electrical signal back into an optical signal to be transmitted over the OSC, and transmit it through network 300 via point 305. This process may take a certain amount of time.

While the above mentioned process is occurring with respect to clock information 301, the scrambled signal may pass through amplifier 108b. Additionally, before reaching point 305, the scrambled signal may also pass through a dispersion compensation module (not expressly shown). The amount of time for the scrambled signal to pass through amplifier 108b and the dispersion compensation module may not be the same amount of time required for OSC reception and transmission. Accordingly, the delay between clock information 301 and the signal with its associated polarization orientation may also change, thus causing the phase shift to change.

A similar type of change in phase may occur as clock information 301 is received by OSC receiver 304b and polarization monitor 306 while the scrambled signal propagates through amplifier 108c before reaching PDS 126 and polarization monitor 306 at point 307. As such, the polarization orientation of the scrambled signal received at polarization monitor 306 and PDS 126 may be out of phase with the polarization orientation associated with clock information 301 received at polarization monitor 306.

Figure 4:
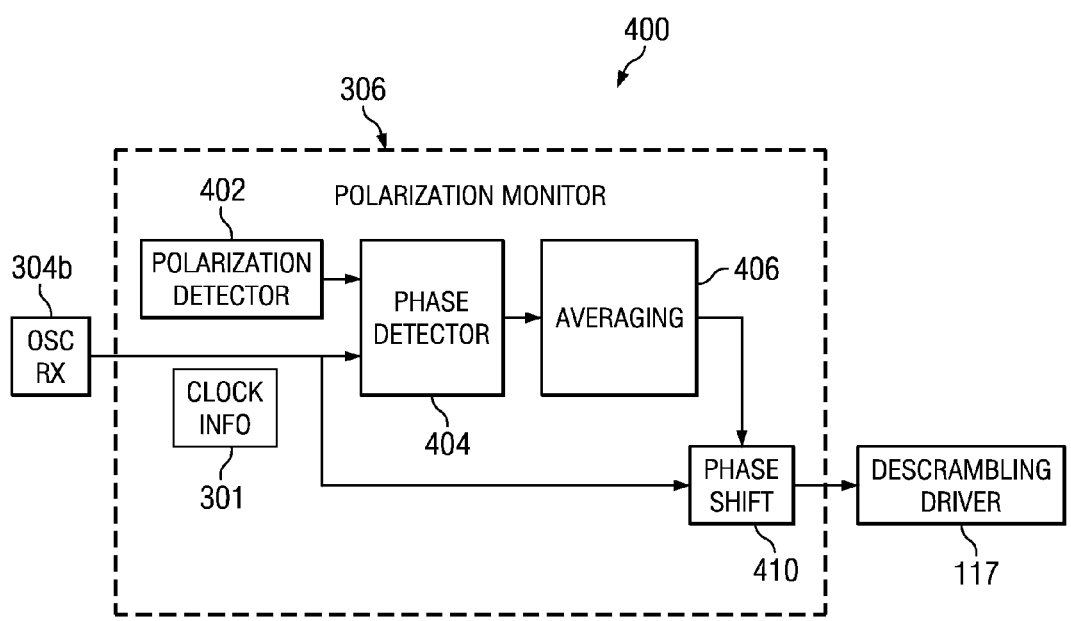
FIG. 4 illustrates a block diagram of a system that includes another example embodiment of a polarization monitor coupled to a descrambling driver in an optical network.

As discussed with respect to FIG. 4, polarization monitor 306 may be configured to determine the polarization scrambling of the signal using clock information 301, despite the possible phase shift between the polarization scrambling and clock information 301.

FIG. 4 illustrates a block diagram of a system 400 that includes an example embodiment of polarization monitor 306 coupled to descrambling driver 117 in network 300. In the present embodiment, polarization monitor 306 may be configured to determine the polarization scrambling of the scrambled signal using clock information 301. Polarization monitor 306 may include a polarization detector 402 substantially similar to polarization detector 202 of FIG. 2. As such, polarization detector 402 may be configured to determine and detect the polarization scrambling of the scrambled optical signal received at point 307 of network 300 and generate an electrical signal indicating the polarization scrambling. In some instances, the electrical signal may comprise a sine wave with a frequency generally representing the scrambling frequency and a phase approximately representing the polarization orientation. However, as discussed with respect to polarization detector 202 of FIG. 2, the electrical signal generated by polarization detector 402 may include jitter associated with environmental factors surrounding the fiber.

Polarization monitor 306 may also be configured to receive an electrical signal from OSC receiver 304b that includes clock information 301. In the present embodiment, clock information 301 may comprise a signal generally representing the scrambling frequency of the scrambled signal. Clock information 301 may include little to no jitter, similarly to the signal generated by cavity 206 in FIG. 2. Accordingly, polarization monitor 306 may be configured to generate an electrical signal to send to descrambling driver 117 based on clock information 301 similarly to polarization monitor 124 generating a signal to send to descrambling driver 117 based on the signal generated by cavity 206 in FIG. 2.

As mentioned above, although clock information 301 may generally represent the scrambling frequency, clock information 301 may be out of phase with the polarization scrambling of the optical signal received by polarization monitor 306 and PDS 126. Therefore, clock information 301 may also be out of phase with the electrical signal generated by polarization detector 402.

Similar to polarization monitor 124 of FIG. 2, polarization monitor 306 may include a phase detector 404 configured to receive clock information 301 as an electrical signal from OSC receiver 304b. Phase detector 404 may also be configured to receive the electrical signal that indicates the scrambling frequency and polarization orientation of the scrambled signal from polarization detector 402. Phase detector 404 may comprise any suitable system, apparatus or device configured to determine the phase difference between clock information 301 and the electrical signal received from polarization detector 402. Therefore, phase detector 404 may also determine the phase difference between clock information 301 and the polarization scrambling of the optical signal received at polarization monitor 306 and PDS 126. Phase detector 404 may be substantially similar to phase detector 204 of FIG. 2. Phase detector 404 may be configured to send the determined phase difference to averaging unit 408.

Averaging unit 408 may be substantially similar to averaging unit 208 of FIG. 2 and may be configured to determine the average in the phase difference detected and determined by phase detector 404. The averaging may be done to compensate for possible fluctuations in the determined phase difference due to jitter associated with the scrambled optical signal as detected by polarization detector 402. Averaging unit 408 may be coupled to phase shift unit 410 such that the averaged phase difference is sent to phase shift unit 410.

Phase shift unit 410 may be substantially similar to phase shift unit 210 of FIG. 2 and may be communicatively coupled to averaging unit 408 and OSC receiver 304b. Phase shift unit 410 may be configured to receive the averaged phase difference information from averaging unit 408 and may also be configured to receive clock information 301 from OSC receiver 304b. Phase shift unit 410 may be configured to apply the averaged phase difference to clock information 301 such that the phase of clock information 301 is shifted by the phase difference. Accordingly, phase shift unit 410 may output an electrical signal having a frequency and phase respectively indicating the scrambling frequency and polarization orientation of the scrambled signal. Additionally, the outputted signal of phase shift unit 410 may have little to no jitter due to the base signal being generated based on clock information 301 and not the scrambled signal detected by polarization detector 402. Phase shift unit 410 may be coupled to descrambling driver 117 such that descrambling driver 117 receives the outputted signal indicating the polarization orientation of the scrambled signal from phase shift unit 410.

Returning to FIG. 3, descrambling driver 117 may be configured to direct PDS 126 to descramble the scrambled signal according to the signal received from phase shift unit 410, similarly to as described with respect to FIGS. 1 and 2. Additionally, descrambling driver 117 and PDS 126 of FIG. 3 may be referred to as a descrambling unit. The descrambled signal may be transmitted from PDS 126 to demultiplexer 105 and receivers 112 to be processed and analyzed.

Modifications, additions, or omissions may be made to FIGS. 3 and 4 without departing from the scope of the present disclosure. For example, network 300 may comprise any suitable type of network and the present disclosure is not limited to a point to point network as shown. Additionally, in some embodiments an optical network may not include a polarization monitor configured to determine the polarization orientation of the scrambled signal.

Figure 5:
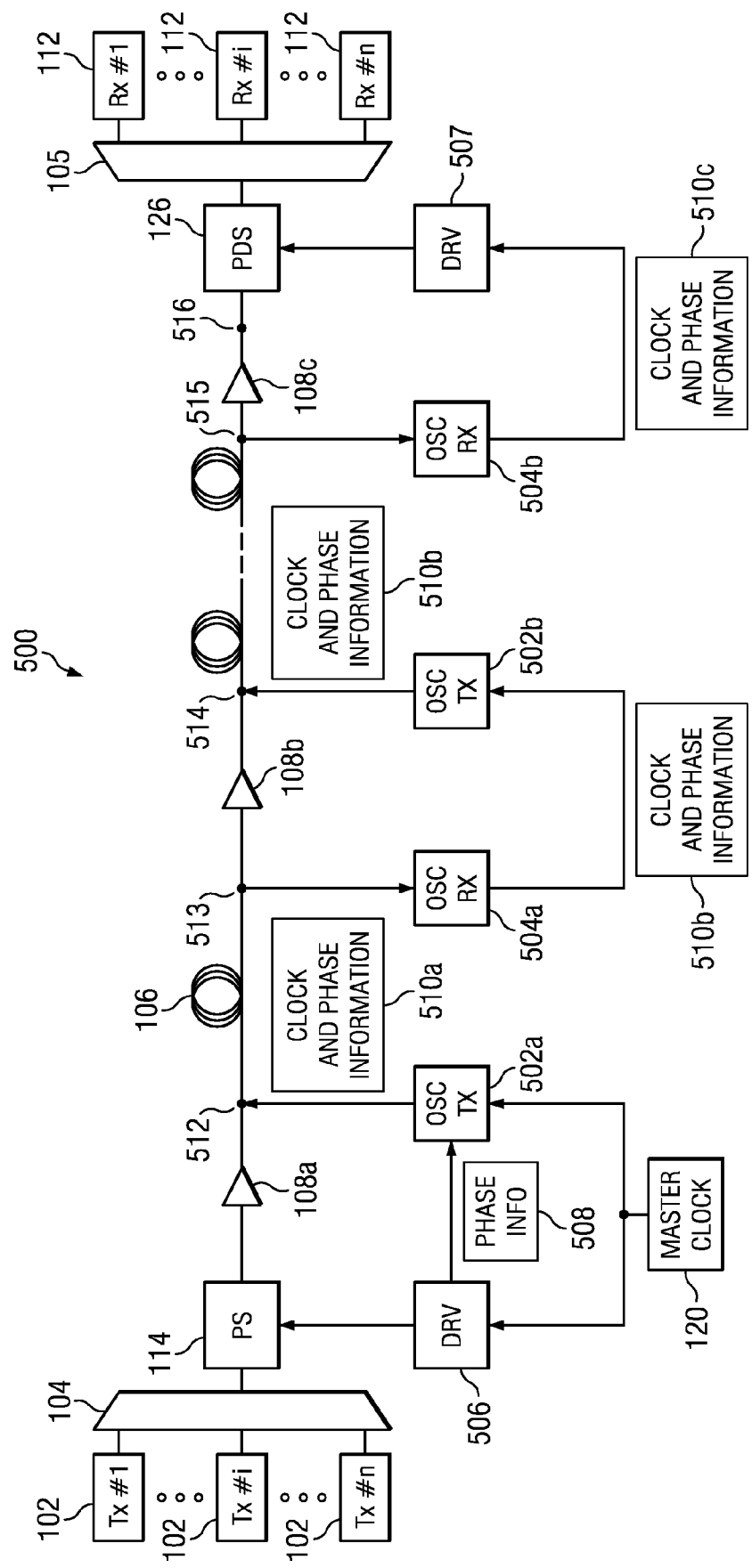
FIG. 5 illustrates another example embodiment of an optical network configured to scramble polarization modulated signals to reduce polarization dependent loss and polarization hole burning.

FIG. 5 illustrates another example embodiment of an optical network 500 configured to scramble polarization modulated signals to reduce polarization dependent loss and polarization hole burning. In the present example network 500 may not include a polarization monitor configured to determine the polarization scrambling of a signal at a destination node. As discussed in further detail below, network 500 may be configured to determine and transmit information related to the scrambling of the optical signals as the signals propagate through network 500 such that the information indicates the polarization scrambling of signals received at a destination of network 500.

Network 500 may include a master clock 120, transmitters 102, one or more multiplexers 104, a PS 114, one or more amplifiers 108, one or more fibers 106, a PDS 126, one or more demultiplexers 105 and one or more receivers 112 that are substantially similar to those described with respect to FIGS. 1 and 3. System 500 may include a scrambling driver 506 configured to receive a clock signal from master clock 120 and configured to direct PS 114 to scramble signals according to the received clock signal. Scrambling driver 506 may comprise any system, apparatus, or device substantially similar to scrambling driver 116 of FIGS. 1 and 3.

System 500 may include an optical supervisory channel (OSC) substantially similar to the OSC described with respect to FIG. 3. System 500 may additionally include OSC transmitters 502 and OSC receivers 504 configured to transmit and receive, respectively, clock and phase information 510 over the OSC through network 500. As discussed in further detail below, clock and phase information 510 may indicate the polarization scrambling of the signals propagating through network 500. In some embodiments, OSC transmitters 502 and OSC receivers 504 may comprise any system, apparatus or device substantially similar to OSC transmitters 302 and OSC receivers 304 of FIG. 3.

Additionally, as discussed in further detail below, system 500 may include a descrambling driver 507 configured to receive clock and phase information 510 from the OSC. Descrambling driver 507 may be configured to direct PDS 126 to descramble the scrambled signal received by PDS 126 according to the clock and phase information 510 received.

OSC transmitter 502a may be configured to receive a clock signal from master clock 120 and to generate an optical signal representing master clock 120 that may be referred to as clock information, similar to clock information 301 of FIG. 3. The clock information may comprise a signal that generally represents or indicates the scrambling frequency of signals being scrambled by PS 114. Similarly to as described previously, due to differences in delays, a phase difference may occur between the polarization scrambling of a signal received at point 512 and clock information received at point 512. Accordingly, scrambling driver 506 may be configured to send phase information 508 to OSC transmitter 502a. Phase information 508 may be associated with the delay between when scrambling driver 506 receives a clock signal from master clock 120 and when the associated scrambled signal reaches point 512 of network 500.

At OSC transmitter 502a, phase information 508 may be applied to the clock information to shift the phase of the clock information, such that the clock information is in phase with the polarization scrambling. The resultant signal may comprise clock and phase information 510a transmitted at point 512 of network 500. Clock and phase information 510a at point 512 may accordingly comprise a signal indicating the polarization scrambling of signals received at point 512. In some embodiments, clock and phase information 512 may comprise a signal having a frequency associated with the scrambling frequency of the scrambled signal and also a phase associated with the polarization orientation of the scrambled signal received at point 512.

Similarly, clock and phase information 510b may be generated by OSC receiver 504a and/or OSC transmitter 502b to account for the difference in delays between the propagation of OSC signals (e.g., clock and phase information 510) and the scrambled signal from point 513 of network 500 to point 514 of network 500. Accordingly, a phase shift associated with the delay differences between points 513 and 514 may be applied to clock and phase information 510a to generate clock and phase information 510b. The phase shift may be applied to clock and phase information 510a after OSC receiver 504a converts clock and phase information 510a to an electrical signal. Therefore, the electrical signal received by OSC transmitter 502b may comprise clock and phase information 510b associated with the additionally phase shift. OSC transmitter 502b may convert clock and phase information 510b into an optical signal and may transmit clock and phase information 510b through network 500 at point 514. Therefore, clock and phase information 510b at point 514 may be in phase with the polarization scrambling of the scrambled signal at point 514.

Also, OSC receiver 504b and/or descrambling driver 507 may be similarly configured to apply a phase shift to clock and phase information 510b to generate clock and phase information 510c. The phase shift may be associated with different propagation delays between the scrambled signal from point 515 of network 500 to point 516 of network 500 and clock and phase information 510 from point 515 to descrambling driver 507. In some embodiments, the phase shift may be associated with delays between when descrambling driver 507 receives clock and phase information 510c and when PDS 126 descrambles the scrambled signal according to instructions received from descrambling driver 507 based on clock and phase information 510c. In alternative embodiments, descrambling driver 507 may be configured to apply the phase shift to the clock and phase information after receiving the clock and phase information from OSC receiver 504b.

In the present example, clock and phase information 510c received by descrambling driver 507 from OSC receiver 504b may comprise an electrical signal having a frequency and phase respectively associated with the scrambling frequency and polarization orientation of scrambled signals received by PDS 126. Clock and phase information 510c may be substantially similar to the electrical signal received by descrambling drivers 117 from polarization monitors 124 and 306 of FIGS. 1-2 and FIGS. 3-4 respectively.

Descrambling driver 507 may accordingly direct PDS 126 to descramble the scrambled signal based on clock and phase information 510c similarly to the descrambling based on the electrical signals received from the polarization monitors of FIGS. 1-4. Descrambling driver 507 and PDS 126 may also be included in a descrambling unit or may be referred to collectively as a descrambling unit. Accordingly, network 500 may scramble optical signals and coherently descramble the optical signals without the used of a polarization monitor. As mentioned previously, scrambling may be advantageous to reduce PDL and PHB of polarization multiplexed optical signals and coherent descrambling may be advantageous to enable extracting the information from the polarization multiplexed signals.

Modifications, additions or omissions may be made to network 500 without departing from the scope of the present disclosure. For example, some networks may include additional components such as one or more optical add/drop modules (OADMs) configured to add and drop signals to the network.

Figure 6:
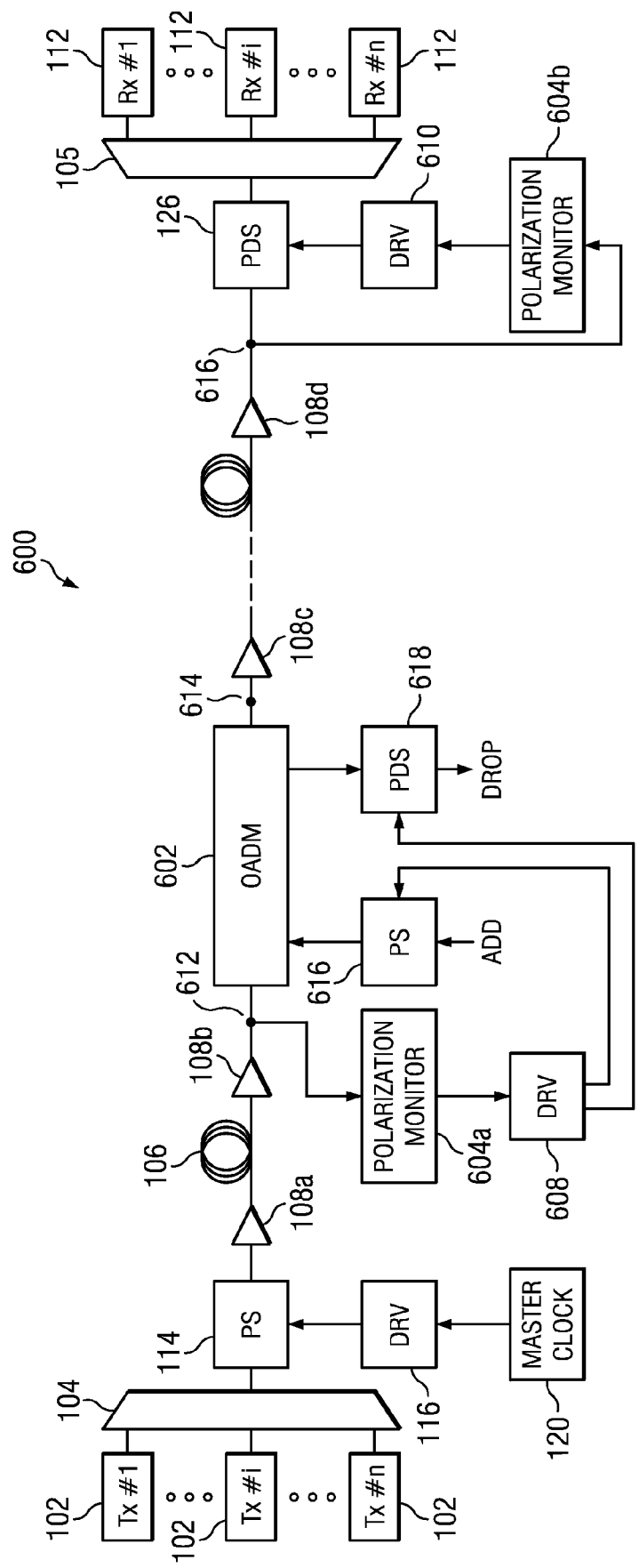
FIG. 6 illustrates an example embodiment of an optical network that includes one or more optical add/drop modules (OADMs) and that may be configured to scramble polarization modulated signals to reduce polarization dependent loss and polarization hole burning.

FIG. 6 illustrates an example embodiment of an optical network 600 that includes one or more optical add/drop modules (OADMs) and that may be configured to scramble polarization modulated signals to reduce polarization dependent loss and polarization hole burning. Network 600 may be substantially similar to networks 100, 300 and 500, but may also include OADM 602, polarization monitor 604a, scrambling/descrambling driver 608, polarization scrambler (PS) 616 and polarization descrambler (PDS) 618. As described in further detail, OADM 602, polarization monitor 604a, driver 608, PS 616 and PDS 618 may be configured to add and drop signals to and from network 600 and scramble the added signals and descramble the dropped signals.

OADM 602 may be coupled to network 600 via fiber 106 between points 612 and 614 such that signals may be added to or dropped from network 600 between these points. OADM 602 may comprise an add/drop module, which may include any system, apparatus or device configured to add and/or drop optical signals from fibers 106. After passing through OADM 602, a signal may travel along fibers 106 directly to a destination, or the signal may be passed through one or more additional OADMs before reaching a destination.

System 600 may also include polarization monitor 604a configured to determine the polarization scrambling of scrambled signals entering OADM 602 at point 612 such that the signals being dropped at OADM 602 may be descrambled. The determined polarization scrambling may also be used such that the signals being added at OADM 602 may be scrambled to have the same polarization scrambling as the signals already propagating through network 600. Polarization monitor 604a may be configured to send information indicating the polarization scrambling to scrambling/descrambling driver 608 (e.g., Polarization monitor 604a may convey an electrical signal having a frequency and phase associated with the scrambling frequency and the polarization orientation, respectively, of a scrambled signal to driver 608).

In some embodiments, Polarization monitor 604a may be substantially similar to polarization monitor 124 of FIGS. 1 and 2. In alternative embodiments, polarization monitor 604a may be configured to receive clock information transmitted over an OSC (not expressly shown), and generate the polarization scrambling information partially based on the clock information, similarly to polarization monitor 306 of FIGS. 3 and 4. In yet other embodiments, network 600 may not include polarization monitor 604a. In such embodiments, driver 608 may receive, over the OSC, clock and phase information (not expressly shown) indicating the polarization scrambling of scrambled signals at node 612, similar to that described with respect to FIG. 5.

Driver 608 may be communicatively coupled to both PS 616 and PDS 618. Driver 608 may comprise any suitable system apparatus or device configured to drive PS 616 to scramble signals being added at OADM 602 and to drive PDS 618 to descramble signals being dropped at OADM 602. In some embodiments, system 600 may include a separate driver for driving PS 616 and a separate driver for driving PDS 618. Driver 608 may be substantially similar to the scrambling and descrambling drivers of FIGS. 1-5.

PS 616 may be substantially similar to PS 114 and may be coupled to OADM 602 such that PS 616 scrambles signals being added to network 600 at OADM 602. PDS 618 may be substantially similar to PDS 126 and may be coupled to OADM 602 such that PDS 618 descrambles signals being dropped from network 600 at OADM 602. Accordingly, with respect to polarization scrambling, PS 616 and driver 608 may be collectively referred to as a scrambling unit, and with respect to polarization descrambling, PDS 618 and driver 608 may be collectively referred to as a descrambling unit. Therefore, the coherent polarization scrambling detection may be used while adding and dropping signals at OADM 602, thus enabling polarization scrambling of polarization multiplexed signals to reduce PDL and PHB in network 600 comprising an OADM 602.

System 600 may also include polarization monitor 604b, descrambling driver 610 and PDS 126 configured to descramble scrambled signals before the signals are received by demultiplexer 105. Polarization monitor 604b may be substantially similar to polarization monitor 604a and may be configured to determine the polarization scrambling of scrambled signals entering PDS 126. Polarization monitor 604b may be configured to send the polarization scrambling information to descrambling driver 610. For example, polarization monitor 604b may convey an electrical signal having a frequency and phase associated with the scrambling frequency and the polarization orientation, respectively, of a scrambled signal to descrambling driver 610.

In some embodiments, polarization monitor 604b may be substantially similar to polarization monitor 124 of FIGS. 1 and 2. In alternative embodiments, polarization monitor 604b may be configured to receive clock information transmitted over an OSC (not expressly shown), and generate the polarization scrambling information partially based on the clock information, similarly to polarization monitor 306 of FIGS. 3 and 4. In yet other embodiments, network 600 may not include polarization monitor 604b. In such embodiments, descrambling driver 610 may receive, over the OSC, clock and phase information (not expressly shown) indicating the polarization scrambling of scrambled signals at node 616, similar to that described with respect to FIG. 5.

Descrambling driver 610 may be communicatively coupled to PDS 126. Descrambling driver 610 may comprise any suitable system apparatus or device configured to drive PDS 126 to descramble signals being received by PDS 126 at point 616. Descrambling driver 610 may be substantially similar to the descrambling drivers of FIGS. 1-5.

PDS 126 may be substantially similar to PDS 126 of FIGS. 1, 3 and 5 and may be configured to descramble the scrambled signals according to instructions received from descrambling driver 610. After being descrambled by descrambling driver 126, the WDM signals may be sent to demultiplexer 105 to be divided according to their individual wavelengths and may be received by receivers 112.

Modifications, additions or omissions may be made to network 600 without departing from the scope of the present disclosure. For example, as described in further detail with respect to FIG. 7, the scrambled WDM signals may be descrambled before entering an OADM and then rescrambled after reentering the network from the OADM.

Figure 7:
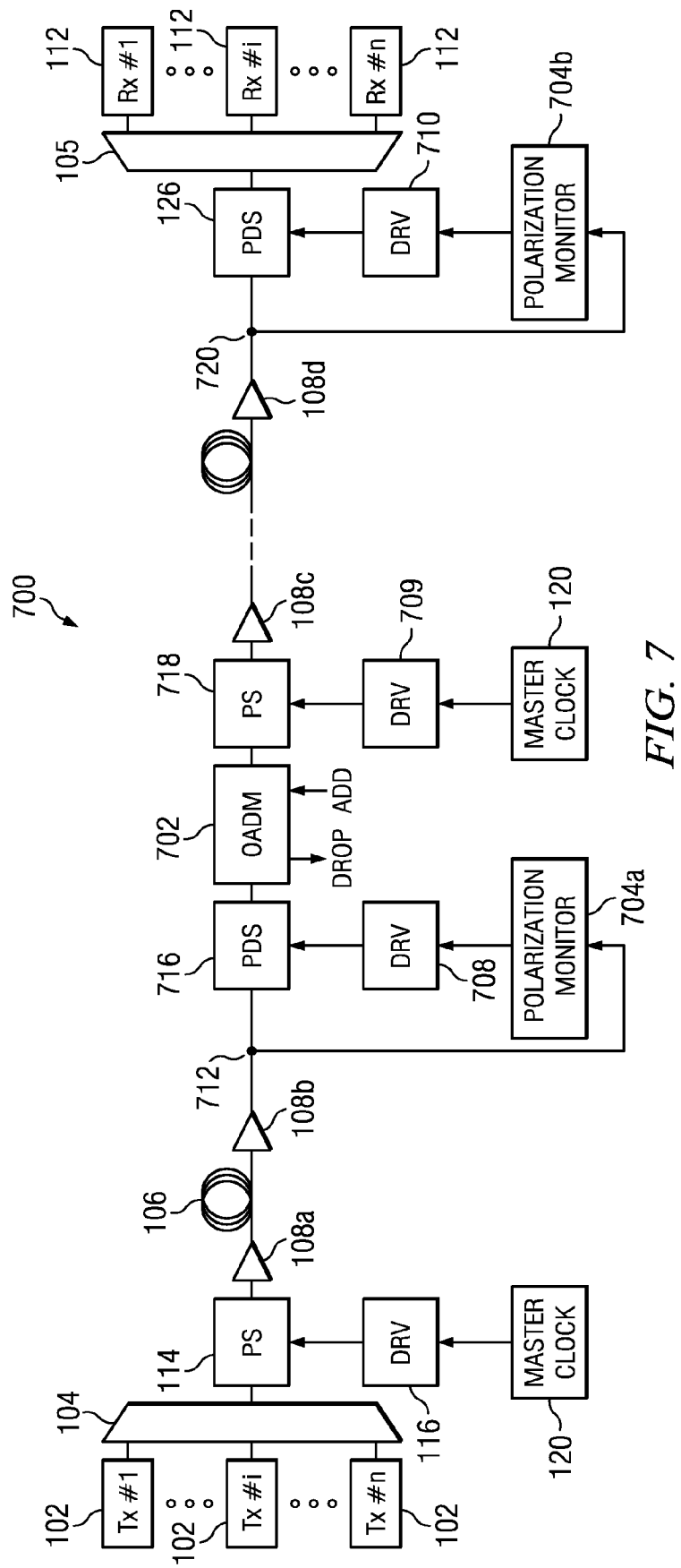
FIG. 7 illustrates another example embodiment of an optical network that includes one or more OADMs and that may be configured to scramble polarization modulated signals to reduce polarization dependent loss and polarization hole burning.

FIG. 7 illustrates another example embodiment of an optical network 700 that includes one or more OADMs and that may be configured to scramble polarization modulated signals to reduce polarization dependent loss and polarization hole burning. Network 700 may be substantially similar to network 600, and may include OADM 702 substantially similar to OADM 602. However, Network 700 may be configured to descramble scrambled signals before the signals enter OADM 702, such that signals being added at OADM 702 are being added to a descrambled signal, and such that signals being dropped at OADM 702 are already descrambled, whereas in network 600 the signals being added may be scrambled prior to being added and the signals being dropped may be descrambled after being dropped.

Network 700 may include polarization descrambler (PDS) 716 coupled to network 700 at the input of OADM 702. PDS 716 may be substantially similar to PDS 126 of FIGS. 1-6 and may be configured to descramble scrambled signals before the signals enter OADM 702. PDS 716 may descramble the scrambled WDM signals according to instructions received from a descrambling driver 708 that may be substantially similar to the descrambling drivers of FIGS. 1-6. Therefore, the signal passing through OADM 702 may not comprise a scrambled signal such that signals being added at OADM 702 may be added to an unscrambled signal and signals being dropped at OADM 702 may also already be descrambled, thus enabling polarization scrambling of polarization multiplexed signals to reduce PDL and PHB in network 700 comprising an OADM 702.

In some embodiments, descrambling driver 708 may direct PDS 716 to descramble the scrambled signals according to polarization scrambling information received from polarization monitor 704a. In alternative embodiments, descrambling driver 708 may direct PDS 716 to descramble the scrambled signals according to polarization scrambling information associated with clock and phase information received over the OSC (not expressly shown), such as described with respect to FIG. 5. Descrambling driver 708 and PDS 716 may collectively be referred to as a descrambling unit.

Polarization monitor 704a may be coupled to network 700 at point 712 of network 700. Polarization monitor 704a may comprise any suitable polarization monitor configured to determine the polarization scrambling of the scrambled signals entering PDS 716 at point 712. In some embodiments, polarization monitor 604a may be substantially similar to polarization monitor 124 of FIGS. 1 and 2. In alternative embodiments, polarization monitor 704a may be configured to receive clock information transmitted over an OSC (not expressly shown), and generate the polarization scrambling information partially based on the clock information, similarly to polarization monitor 306 of FIGS. 3 and 4.

Network 700 may additionally include a polarization scrambler (PS) 718 coupled to network 700 at the output of OADM 702 such that PS 718 may receive the signals entering network 700 from OADM 702. PS 718 may be configured to scramble the signals coming from OADM 702 to reduce polarization dependent loss of those signals. PS 718 may be configured to scramble the signals as directed by a scrambling driver 709 coupled to PS 718.

In some embodiments, scrambling driver 709 may direct PS 718 to scramble the signals according to the clock signal sent from master clock 120, similarly to as described in FIG. 1 with respect to PS 114, scrambling driver 116 and master clock 120. In the same or alternative embodiments, clock information associated with the polarization scrambling of signals being scrambled by PS 718 may be transmitted through network 700 via an OSC of network 700 (not expressly shown), similarly to as described in FIG. 3 with respect to PS 114, scrambling driver 116, master clock 120 and OSC transmitter 302*a*. Additionally, in some embodiments, scrambling driver may also transmit phase information associated with scrambling and propagation delays to an OSC transmitter, and the OSC transmitter may transmit clock and phase information through network 700 via the OSC of network 700 similarly to as described in FIG. 5.

System 700 may also include polarization monitor 704*b*, descrambling driver 710 and PDS 126 configured to descramble scrambled signals before the signals are received by demultiplexer 105. Polarization monitor 704*b* may be substantially similar to polarization monitor 704*a* and may be configured to determine the polarization scrambling of scrambled signals entering PDS 126. Polarization monitor 704*b* may be configured to send the polarization information to descrambling driver 710. For example, polarization monitor 704*b* may convey an electrical signal having a frequency and phase associated with the scrambling frequency and the polarization orientation, respectively, of a scrambled signal to descrambling driver 710.

In some embodiments, polarization monitor 704*b* may be substantially similar to polarization monitor 124 of FIGS. 1 and 2. In alternative embodiments, polarization monitor 704*b* may be configured to receive clock information transmitted over an OSC (not expressly shown), and generate the polarization scrambling information partially based on the clock information, similarly to polarization monitor 306 of FIGS. 3 and 4. In yet other embodiments, network 700 may not include polarization monitor 704*b*. In such embodiments descrambling driver 710 may receive, over the OSC, clock and phase information (not expressly shown) indicating the polarization scrambling of scrambled signals at node 720, similar to that described with respect to FIG. 5.

Descrambling driver 710 may be communicatively coupled to PDS 126. Descrambling driver 710 may comprise any suitable system apparatus or device configured to drive PDS 126 to descramble signals being received by PDS 126 at point 616. Descrambling driver 710 may be substantially similar to the descrambling drivers of FIGS. 1-6.

PDS 126 may be substantially similar to PDS 126 of FIGS. 1, 3, 5 and 6 and may be configured to descramble the scrambled signals according to instructions received from descrambling driver 710. Descrambling driver 710 and PDS 126 may also be collectively referred to as a descrambling unit. After being descrambled by descrambling driver 126, the WDM signals may be sent to demultiplexer 105 to be divided according to their individual wavelengths and may be received by receivers 112.

Modifications, additions or omissions may be made to any one of networks 100, 300, 500, 600 and 700 without departing from the scope of the present disclosure. For example, as discussed in further detail below, receivers 112 may comprise coherent receivers configured to determine the polarization orientation of signals received at the each receiver such that the polarization descrambling described before a scrambled WDM signal is demultiplexed by demultiplexer 105 may be unnecessary.

Figure 8:
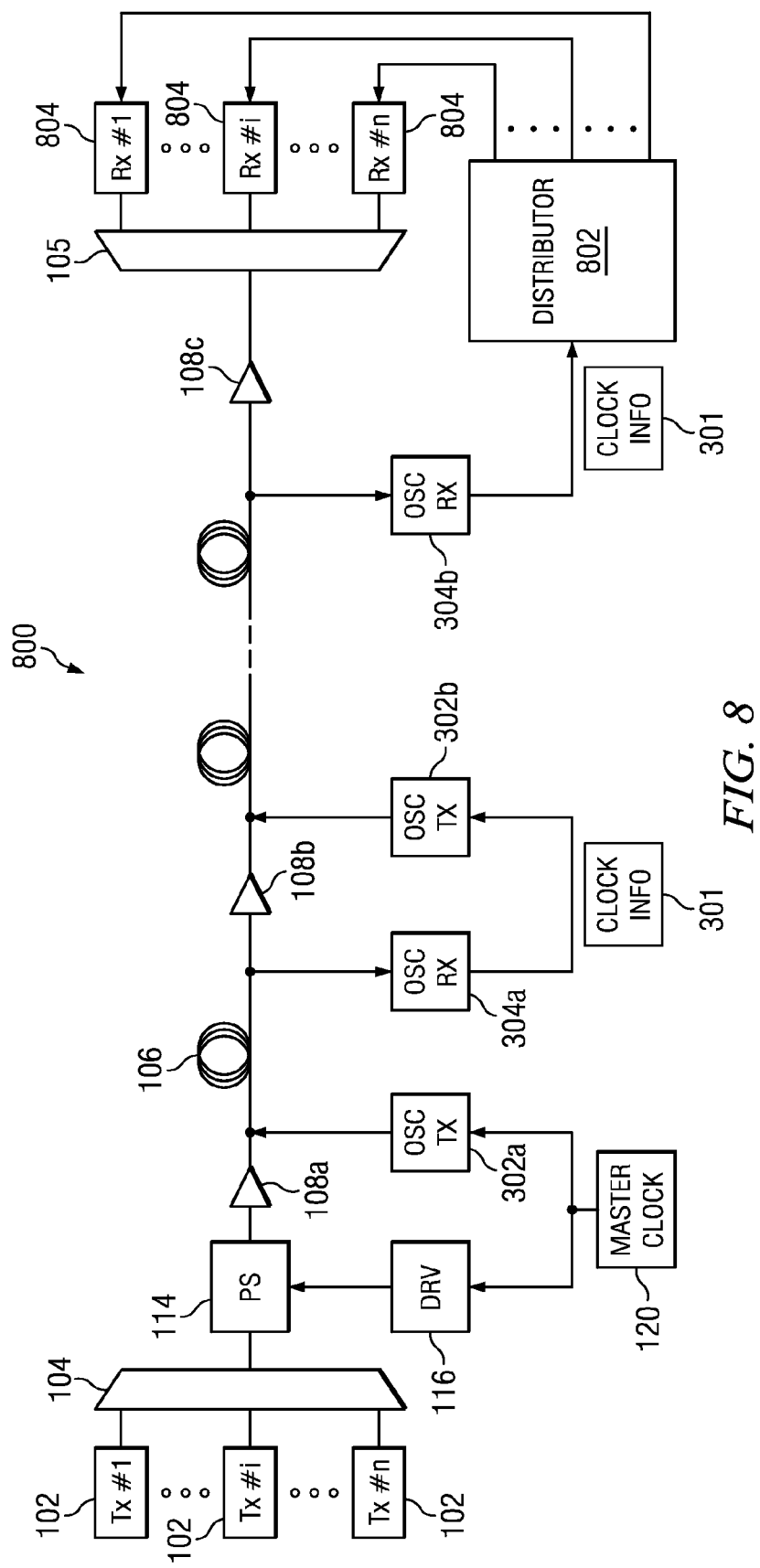
FIG. 8 illustrates an example network comprising coherent receivers configured to coherently detect polarization scrambling of an optical signal.

FIG. 8 illustrates an example network 800 comprising coherent receivers 804 configured to coherently detect polarization scrambling of an optical signal. Network 800 may comprise any suitable optical network, and in the present example, may comprise a network substantially similar to network 300 of FIG. 3. Accordingly, network 800 may be configured to transmit clock information 301 over an OSC of optical network 800. However, unlike network 300, network 800 may not include PDS 126, polarization monitor 306 and descrambling driver 117 configured to descramble scrambled WDM signals before the WDM signals reach demultiplexer 105. Network 800 may instead include one or more coherent receivers 804 each configured to determine the polarization scrambling of scrambled optical signals received at each coherent receiver 804 and may descramble the signals accordingly.

Coherent receivers 804 may comprise any suitable system apparatus or device configured to descramble received signals. Coherent receivers 804 may be configured to determine the polarization orientation of the modulated components (e.g., x polarization component and y polarization component) of the received scrambled signals and may accordingly be configured to process the information modulated thereon.

In the present example, coherent receivers 804 may each include a polarization monitor (not expressly shown) similar to polarization monitor 306 of FIGS. 3 and 4. As such, the polarization monitors of coherent receivers 804 may be configured to generate a signal indicating the polarization scrambling of the scrambled signals partially by using clock information 301. Accordingly, network 800 may include a distributor 802 configured to distribute clock information 301 to each polarization monitor of each coherent receiver 804. After generating the polarization scrambling information of the received scrambled signals, the polarization monitors of coherent receivers 804 may communicate that information indicating such to a digital signal processor (DSP) included in each coherent receiver 804.

The DSP may descramble the polarization scrambling by using the electrical signal representing the polarization scrambling. The DSP may be configured to achieve the same outcome as the descrambling drivers and polarization descramblers described above. Therefore, the DSP associated with the coherent receivers may also be referred to as a descrambling unit.

In signal detection, coherent receivers 804 may split the scrambled signal according to horizontal and vertical polarization components respectively aligned with the horizontal and vertical axes of the frame of reference. When the modulated x and y polarization components are not oriented with the horizontal and vertical axes, (as caused by the polarization scrambling) there may be errors in extracting the information associated with the modulated x and y polarization components that are manifested as cross-talk. These cross-talk errors may be manifested at the frequency and phase of the polarization scrambling. Accordingly, in some embodiments, the DSP associated with coherent receivers 804 may subtract the cross talk from the x-polarization component as a function of the y-polarization component and the phase of the electrical signal representing the scrambling of the scrambled signal and vice versa. Therefore, the cross-talk may be cancelled.

For example, in some instances the cross talk cancellation of the x-polarization component (xpol) as a function of the y-polarization component (ypol) and the polarization scrambling may be generally represented by the following equation:

Cross-talk cancellation of $xpol=xpol-ypol*Sin(sin(\omega t+\phi))$

Similarly, the cross talk cancellation of the y-polarization component as a function of the x-polarization component and the polarization scrambling may be generally represented by the following equation:

Cross-talk cancellation of $ypol=ypol-xpol*Cos(sin(\omega t+\phi))$

In both equations, as discussed above, the result of $sin(\omega t+\phi)$ may indicate the polarization orientation expressed as an angle of deviation from the frame of reference. Further, $\omega$ may represent the scrambling frequency and $\phi$ may represent the phase shift of the received signal. Further as mentioned above, the electrical signal indicating the polarization scrambling and received by the DSP may be generally represented by the equation $sin(\omega t+\phi)$ also. Therefore, in some instances, the DSP may use the electrical signal received from the polarization monitor to cancel the cross-talk by applying the cross-talk cancellation equations above with the electrical signal. As such, the DSP may act as a descrambling unit and descramble the polarization scrambling.

In an alternative embodiment, coherent receivers 804 may not include polarization monitors, but may each receive clock and phase information having a frequency and phase indicating the scrambling frequency and polarization orientation, respectively, of the scrambled signals (e.g., clock and phase information 510 of FIG. 5) received by each coherent receiver 804. In such embodiments, distributor 802 may be coupled to each coherent receiver 804 such that the respective DSP of each coherent receiver receives the clock and phase information.

In yet alternative embodiments, coherent receivers 804 may not include a polarization monitor and may be configured to receive just clock information 301 that may not indicate a phase shift. In such embodiments each coherent receiver 804 may each also include a phase shift unit (not expressly shown) configured to receive clock information 301 from distributor 802. The phase shift unit may be configured to shift the phase of the polarization scrambling associated with clock information 301. The phase shift unit may be configured to transmit shifted clock information 301 to the DSP of coherent receiver 804.

In such embodiments, the DSP may be configured to transmit processed signals to a framer (not expressly shown). The framer may be configured to determine the bit error rate (BER) of the information received from the DSP. The more out of phase clock information 301 is from the polarization scrambling of the received signal, the higher the bit error rate may be. The framer may be configured to send the bit error rate to a BER monitor (not expressly shown) coupled to the framer.

The BER monitor may also be coupled to the phase shift unit and may be configured to direct the phase shift unit to shift the phase of clock information 301 according to the bit error rate received from the framer, thus creating a feedback loop. For example, if the bit error rate is above a minimum threshold level, the BER monitor may direct the phase shift unit to shift the phase of clock information 301, such that the polarization orientation of clock information 301 may be moved closer to the polarization orientation of the scrambled signal. Once the bit error rate is at or below a threshold minimum—indicating that the polarization scrambling and the scrambling indicated by clock information 301 are substantially similar—the BER monitor may direct the phase shift unit to stop further shifting of clock information 301.

In alternative embodiments, coherent receivers 804 may each include a polarization monitor (not expressly shown) similar to polarization monitor 124 described with respect to FIGS. 1 and 2. In such embodiments, the polarization monitor may determine the polarization scrambling of the received signal and may transmit information indicating such to the DSP included in each coherent receiver 804. Additionally, in such embodiments, distributor 802 may not be necessary because the polarization monitors may include a cavity instead of using clock information 301 to generate the signal indicating the polarization orientation of the scrambled signals, thus obviating the need for distributor 802 to distribute clock information.

Modifications, additions or omissions may be made to FIG. 8 without departing from the scope of the present disclosure. For example, network 800 may also include OADMs configured to add and drop traffic from network 800. In such embodiments, system 800 may be configured to scramble and descramble signals being added and dropped at the OADMs similar to as described with respect to networks 600 and 700 of FIGS. 6 and 7.

Although the present disclosure and its advantages have been described in detail, it should be understood that various changes, substitutions and alterations can be made herein without departing from the spirit and scope of the disclosure as defined by the following claims.

What is claimed is:

1. A method for detecting polarization scrambling of a polarization multiplexed optical signal comprising:
   receiving a polarization multiplexed optical signal over an optical network and including a scrambled polarization orientation, the polarization orientation scrambled according to a scrambling frequency, the polarization multiplexed optical signal comprising information modulated on a plurality of polarization components of the optical signal;
   receiving, over the optical network, a polarization signal indicating the polarization scrambling of the received polarization multiplexed optical signal, wherein the polarization signal includes phase information indicating the polarization scrambling of the polarization multiplexed optical signal, the phase information based on propagation times associated with the polarization signal and the polarization multiplexed optical signal; and
   descrambling the polarization multiplexed optical signal according to the polarization scrambling as indicated by the polarization signal.

2. The method of claim 1, further comprising receiving the polarization signal over an optical supervisory channel (OSC).

3. The method of claim 1, further comprising scrambling the polarization orientation at the scrambling frequency to reduce polarization dependent effects associated with the polarization multiplexed optical signal.

4. The method of claim 3, further comprising scrambling the polarization orientation as a function of a master clock associated with the optical network such that the scrambling frequency is a function of the master clock and wherein the polarization signal includes clock information indicating the scrambling frequency and associated with the master clock.

5. The method of claim 3, wherein scrambling the polarization orientation comprises rotating the polarization orientation in a first direction at the scrambling frequency and wherein descrambling the polarization orientation comprises rotating the polarization orientation in a second direction opposite the first direction at the scrambling frequency.

6. The method of claim 1, wherein the polarization scrambling is approximately the function of a sine wave comprising a frequency associated with the scrambling frequency and a phase associated with the polarization orientation.

7. The method of claim 1, wherein the polarization signal indicates the scrambling frequency and polarization orientation of the polarization multiplexed optical signal.

8. A system for scrambling polarization of a polarization multiplexed optical signal comprising:
a polarization scrambler configured to scramble a polarization orientation of a polarization multiplexed optical signal associated with an optical network according to a scrambling frequency to reduce polarization dependent effects associated with the polarization multiplexed optical signal, the polarization multiplexed optical signal comprising information modulated on a plurality of polarization components of an optical signal;
wherein the polarization scrambling is approximately the function of a sine wave comprising a frequency associated with the scrambling frequency and a phase associated with the polarization orientation, and wherein a polarization signal includes phase information indicating the polarization phase associated with the polarization orientation, the phase information based on propagation times associated with the polarization signal and the polarization multiplexed optical signal;
an optical transmitter associated with the polarization scrambler and configured to transmit the polarization signal through the optical network, the polarization signal indicating the polarization scrambling of the polarization multiplexed optical signal; and
a descrambling unit associated with the optical network and configured to:
receive the polarization signal over the optical network; and
descramble the polarization multiplexed optical signal according to the polarization scrambling as indicated by the polarization signal.

9. The system of claim 8, wherein the optical transmitter is further configured to transmit the polarization signal over an optical supervisory channel (OSC) and wherein the descrambling driver is further configured to receive the polarization signal over the OSC.

10. The system of claim 8, wherein the polarization scrambler is further configured to scramble the polarization orientation as a function of a master clock associated with the optical network such that the scrambling frequency is a function of the master clock and wherein the polarization signal includes clock information indicating the scrambling frequency and associated with the master clock.

11. The system of claim 8, wherein the polarization scrambler comprises a first polarization rotator configured to rotate the polarization orientation in a first direction at the scrambling frequency and wherein the descrambling unit comprises a second polarization rotator configured to rotate the polarization orientation in a second direction opposite the first direction at the scrambling frequency.

12. The system of claim 8, wherein the descrambling unit further comprises:
a descrambling driver configured to:
receive the polarization signal over the optical network;
determine polarization descrambling according to the polarization scrambling as indicated by the polarization signal; and
generate descrambling instructions from the descrambling driver based on the determined polarization descrambling; and
a polarization descrambler communicatively coupled to the descrambling driver and configured to:
receive the polarization multiplexed optical signal over the optical network as the polarization monitor receives the polarization multiplexed optical signal;
receive the descrambling instructions from the descrambling driver; and
descramble the polarization multiplexed optical signal according to the descrambling instructions received from the descrambling driver.

13. The system of claim 8, wherein the descrambling unit is included in a coherent optical receiver associated with the optical network and configured to receive the polarization multiplexed optical signal and the polarization signal.

14. The system of claim 8, wherein the polarization signal indicates the scrambling frequency of the polarization multiplexed optical signal.

* * * * *